(12) United States Patent
Zhao et al.

(10) Patent No.: US 10,711,388 B2
(45) Date of Patent: Jul. 14, 2020

(54) SUPPORT FOR HOUSEHOLD APPLIANCE, AND HOUSEHOLD APPLIANCE

(71) Applicants:QINGDAO HAIER WASHING MACHINE CO., LTD., Shandong (CN); QINGDAO HAIER SMART TECHNOLOGY R&D CO., LTD., Shandong (CN)

(72) Inventors: Zhiqiang Zhao, Shandong (CN); Sheng Xu, Shandong (CN)

(73) Assignees: QINGDAO HAIER WASHING MACHINE CO., LTD., Shandong (CN); QINGDAO HAIER SMART TECHNOLOGY R&D CO., LTD., Shandong (CN)

( * ) Notice: Subject to any disclaimer, the term of this patent is extended or adjusted under 35 U.S.C. 154(b) by 75 days.

(21) Appl. No.: 15/775,915

(22) PCT Filed: Jun. 29, 2017

(86) PCT No.: PCT/CN2017/090855
§ 371 (c)(1),
(2) Date: May 14, 2018

(87) PCT Pub. No.: WO2018/171073
PCT Pub. Date: Sep. 27, 2018

(65) Prior Publication Data
US 2019/0292713 A1    Sep. 26, 2019

(30) Foreign Application Priority Data

Mar. 23, 2017 (CN) .......................... 2017 1 0178682

(51) Int. Cl.
*F16M 7/00*     (2006.01)
*D06F 39/12*    (2006.01)
(Continued)

(52) U.S. Cl.
CPC ............ *D06F 39/125* (2013.01); *A47B 91/16* (2013.01); *D06F 37/20* (2013.01); *F16M 7/00* (2013.01); *F16M 2200/08* (2013.01)

(58) Field of Classification Search
CPC .......... D06F 37/22; D06F 37/20; D06F 39/12; F16F 15/0275
(Continued)

(56) References Cited

U.S. PATENT DOCUMENTS 2,635,838 A    2/1948  Branson
2,767,944 A *  10/1956 Moore .................. D06F 39/125
                                                    248/634

(Continued)

FOREIGN PATENT DOCUMENTS

CH           663338 A    12/1987
CN        101023239 A     8/2007
(Continued)

OTHER PUBLICATIONS

U.S. Appl. No. 15/775,934, filed May 14, 2018, Zhao et al.

*Primary Examiner* — Steven M Marsh
(74) *Attorney, Agent, or Firm* — Buchanan Ingersoll & Rooney PC

(57) ABSTRACT

The present disclosure provides a support for household appliance and a household appliance. The support for household appliance comprises a hydraulic plate; a sheath, which is fixedly connected with the hydraulic plate; a regulating element, which is arranged in the sheath and is axially movable relative to the sheath; an accommodation chamber, which is formed by the hydraulic plate, the sheath and the regulating element; a hydraulic medium, which is arranged in the accommodation chamber and is compressed/expands depending on pressure changes to drive the regulating element to axially move in the sheath for leveling; at least two supports for household appliance communicate with (Continued)

each other to allow the hydraulic medium to flow between the supports; and the hydraulic plate is provided with a one-way flow stop mechanism for conducting the hydraulic medium in one direction.

13 Claims, 6 Drawing Sheets

(51) Int. Cl.
*A47B 91/16* (2006.01)
*D06F 37/20* (2006.01)

(58) Field of Classification Search
USPC ............. 248/161, 188.5, 157, 420, 421, 423
See application file for complete search history.

(56) References Cited

U.S. PATENT DOCUMENTS

| | | | |
|---|---|---|---|
| 2,956,761 A | 10/1960 | Weber | |
| 3,388,883 A | 6/1968 | Axthammer et al. | |
| 3,456,749 A | 7/1969 | Smieja | |
| 3,589,655 A | 6/1971 | Hackbarth et al. | |
| 3,768,766 A | 10/1973 | Bain | |
| 3,954,241 A | 5/1976 | Carlson | |
| 4,625,424 A * | 12/1986 | de la Haye | G12B 5/00 |
| | | | 248/649 |
| 4,632,228 A | 12/1986 | Oster et al. | |
| 4,967,994 A | 11/1990 | Rice | |
| 6,009,815 A | 1/2000 | Hartman | |
| 7,431,248 B2 | 10/2008 | Cournoyer et al. | |
| 7,921,679 B2 | 4/2011 | Jo | |
| 8,104,724 B2 | 1/2012 | Sorohan | |
| 8,302,743 B2 | 11/2012 | Pike et al. | |
| 8,506,025 B2 | 8/2013 | Kim | |
| 9,004,239 B2 | 4/2015 | Pike et al. | |
| 9,416,483 B1 * | 8/2016 | Freakes | D06F 39/125 |
| 9,568,117 B2 | 2/2017 | Adams et al. | |
| 9,909,709 B2 | 3/2018 | Pike et al. | |
| 10,221,517 B2 | 3/2019 | Zhao et al. | |
| 10,227,723 B2 | 3/2019 | Zhao et al. | |
| 10,294,602 B2 | 5/2019 | Zhao et al. | |
| 2002/0139909 A1 * | 10/2002 | Oyama | A47B 91/02 |
| | | | 248/188.8 |
| 2003/0193000 A1 | 10/2003 | Leveridge | |
| 2006/0102815 A1 * | 5/2006 | Erdmann | A47L 15/4253 |
| | | | 248/188.2 |
| 2007/0023590 A1 | 2/2007 | Lotz | |
| 2007/0023591 A1 * | 2/2007 | Kwon | D06F 39/125 |
| | | | 248/188.3 |
| 2007/0267561 A1 * | 11/2007 | Dam | A47B 91/024 |
| | | | 248/615 |
| 2011/0050064 A1 * | 3/2011 | Phillips | A47B 91/002 |
| | | | 312/351.3 |
| 2011/0247374 A1 * | 10/2011 | Miller | D06F 39/125 |
| | | | 68/139 |
| 2012/0193503 A1 | 8/2012 | Pike | |
| 2013/0313385 A1 * | 11/2013 | Mora | F16M 7/00 |
| | | | 248/188.4 |
| 2016/0025261 A1 | 1/2016 | Pike et al. | |
| 2018/0237978 A1 | 8/2018 | Zhao et al. | |
| 2018/0245266 A1 | 8/2018 | Zhao et al. | |
| 2018/0355546 A1 | 12/2018 | Zhao | |
| 2019/0330789 A1 * | 10/2019 | Zhao | F15B 15/10 |

FOREIGN PATENT DOCUMENTS

| | | |
|---|---|---|
| CN | 201151829 Y | 11/2008 |
| CN | 101864891 A | 10/2010 |
| CN | 102858204 A | 1/2013 |
| CN | 105757408 A | 7/2016 |
| CN | 205671771 U | 11/2016 |
| CN | 106455815 A | 2/2017 |
| DE | 20118743 U | 4/2003 |
| GB | 1315833 A | 5/1973 |
| KR | 20040003391 A | 1/2004 |
| WO | 2012098218 A1 | 7/2012 |

* cited by examiner

SUPPORT FOR HOUSEHOLD APPLIANCE, AND HOUSEHOLD APPLIANCE

TECHNICAL FIELD

The present disclosure relates to the technical field of support leveling of household appliances, and specifically relates to a support for household appliance and a household appliance.

BACKGROUND

A household appliance is generally provided with a leveling device at the bottom of its casing. During placement of the household appliance, the leveling device is adjusted to make the household appliance stably placed. After the household appliance is leveled, the leveling device can support the household appliance to keep the household appliance stable.

Taking a washing machine for example, the existing washing machine is usually provided with bolt supports mounted at the bottom of its casing or the whole machine. Each bolt support comprises a screw rod, a nut washer and a rubber pad, the nut washer can be screwed up and down around the screw rod, and the screw rod can also be screwed up and down in a screw hole in a base plate of the casing. Therefore, the height of the washing machine can be adjusted by screwing the screw rods of the bolt supports into different lengths of the screw holes of the base plate. Mostly, the height of the washing machine is increased if the supports of the washing machine rotate counterclockwise, and the height of the washing machine is reduced if the supports of the washing machine rotate clockwise. After the height adjustment of the bolt supports is completed, the nut washers for preventing loosening are tightened to keep the washing machine stable.

Although said bolt supports of the washing machine implement the leveling of the washing machine, a user still needs to carry out manual adjustment. If the washing machine has a relatively large self weight or a placement space for the washing machine is narrow, it is very inconvenient to operate for user. Additionally, vibration of the washing machine in a long-term working process also act on the leveling supports and causes support failure of the supports, resulting in unlevel placement of the washing machine.

For example, an existing 80 KG drum washing machine generally has a weight of about 80 KG which is relatively heavy, so its height adjustment is very inconvenient for users. Even though the height adjustment is completed, it cannot be ensured that the washing machine is adjusted to an optimal state. When the washing machine works, especially accelerates from 0 r/min to about 1400 r/min for drying, large vibration will occur if the washing machine is placed unlevel or has a failure of support problem, which greatly influences use comfortableness of the user.

In addition, the vibration of the unlevel washing machine may cause loosening of support screws, which result in vertical movement of a support bracket, and such unstability may change the leveling state of the washing machine and cause stronger vibration. Due to such vicious circle, after the washing machine is used for a long term, the noise is larger and larger, the washing machine per se is also damaged to a certain extent, and the service life of the washing machine is shortened.

Therefore, the leveling of the existing washing machine has problems that manual adjustment is needed, time and labor are wasted, and precision is relatively low.

In view of the foregoing, the present disclosure is proposed.

SUMMARY

In order to solve the above-mentioned problems, a first disclosure object of the present disclosure is to provide a support for household appliance, and concretely, a technical solution adopted by the present disclosure is as follows:

A support for household appliance, comprises:
a hydraulic plate;
a sheath, fixedly connected with the hydraulic plate;
a regulating element, which is arranged in the sheath and axially movable relative to the sheath;
an accommodation chamber formed by the hydraulic plate, the sheath and the regulating element;
a hydraulic medium, which is in the accommodation chamber and is compressed/expands depending on pressure changes to drive the regulating element to axially move in the sheath for leveling;
at least two supports for household appliance communicate with each other to allow the hydraulic medium to flow between the supports; and
the hydraulic plate is provided with a one-way flow stop mechanism for conducting the hydraulic medium in one direction.

In some embodiments, the hydraulic plate is provided with a liquid flow passage for allowing the hydraulic medium to flow therein, and the one-way flow stop mechanism is arranged in the liquid flow passage or at an inlet/outlet of the liquid flow passage.

In some embodiments, the one-way flow stop mechanism comprises a one-way valve plate, and the one-way valve plate is arranged at the hydraulic plate to cooperate with the inlet of the liquid flow passage to control the hydraulic medium to flow out in one direction or flow into the accommodation chamber in one direction.

In some embodiments, the one-way flow stop mechanism further comprises a baffle plate installed on the hydraulic plate, the baffle plate is located on one side of the one-way valve plate opening direction, and the baffle plate is used to block the excessive deformation of the one-way valve plate.

In some embodiments, the one-way valve plate is made of a self-recovery elastic deformation material, the one-way valve plate covers hermetically on the inlet of the liquid flow passage, and the one-way valve plate is deformed under the pressure of the hydraulic medium to open the liquid flow passage, and is recovered under the action of elastic deformation force to close the liquid flow passage after the flow of the hydraulic medium is stabilized;

Preferably, the one-way valve plate is made of a stainless steel belt, a polymer material PEEK, or a rubber elastomer of polymer material.

In some embodiments, the one-way flow stop mechanism further comprises an elastic device for resetting the one-way valve plate, the one-way valve plate covers and blocks the liquid flow passage, the one-way valve plate moves under the pressure of the hydraulic medium to open the liquid flow passage, and is reset under the action of the elastic device to close the liquid flow passage after the flow of the hydraulic medium is stabilized.

In some embodiments, the one-way valve plate is arranged in the liquid flow passage, the baffle plate is arranged at the inlet of the liquid flow passage, and the baffle plate is provided with a through hole; the elastic device is arranged between the one-way valve plate and the baffle plate.

In some embodiments, the baffle plate covers on the inlet of the liquid flow passage, a middle portion of the baffle plate is provided with a through hole for allowing the hydraulic medium to pass, and the diameter of the one-way valve plate is larger than the diameter of the through hole.

In some embodiments, inside the hydraulic plate is provided with two liquid flow passages for allowing the hydraulic medium to flow, and the one-way flow stop mechanism is disposed in one of the liquid flow passages;

a liquid flow passage provided with a one-way flow stop mechanism in the hydraulic plate of one support for household appliance communicates with a liquid flow passage without the one-way flow stop mechanism in the hydraulic plate of another support for household appliance.

A second disclosure object of the present disclosure is to provide a household appliance with the support for household appliance according any one of the above-mentioned items, comprises at least two household appliance bottom supports communicated with each other through communicating device so as to allow the hydraulic medium to flow between the supports for household appliance.

The support for household appliance of the disclosure is interconnected to form a supports group for household appliance. When the washing machine is installed with a supports group for household appliance, due to the unevenness of the floor, different supports for household appliance have different levels. The regulating element can be elongated or shortened like a piston to achieve the same internal hydraulic pressure and complete the automatic adjustment of the washing machine.

In addition, during washing process or dehydrating process of the washing machine, the vibration noise of the washing machine is greatly reduced because the hydraulic medium can also slowly flow and level.

The one-way flow stop mechanism of the present disclosure limits the unidirectional conduction of the hydraulic medium, so that when the support for household appliance is subjected to a large impact and the hydraulic medium flows to a direction that does not conform to the conduction direction of the one-way flow stop mechanism, and the one-way flow stop mechanism prevents the sudden flow of the hydraulic medium from causing a sudden expansion and contraction of the support for household appliance.

When the flow direction of the hydraulic medium is in conformity with conduction direction of the one-way flow stop mechanism, the opening of the one-way flow stop mechanism is limited to avoid the sudden expansion and contraction of the support for the household appliance due to the large amount of flow of the hydraulic medium, and that improves the stability and service life of household appliances.

According to the household appliance provided by the present disclosure, by adopting the support for household appliance, automatic leveling is achieved. the installation is simple and convenient, and the whole-set vibration and noise of the household appliance are reduced.

Figure 1:
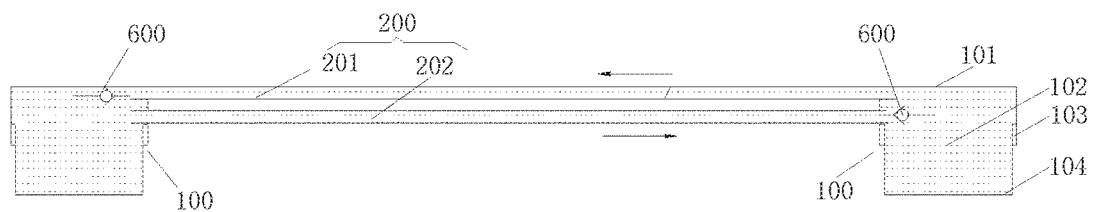
FIG. 1 is an operating-principle schematic diagram 1 of a support for household appliance according to embodiment I of the present disclosure.
Figure 2:
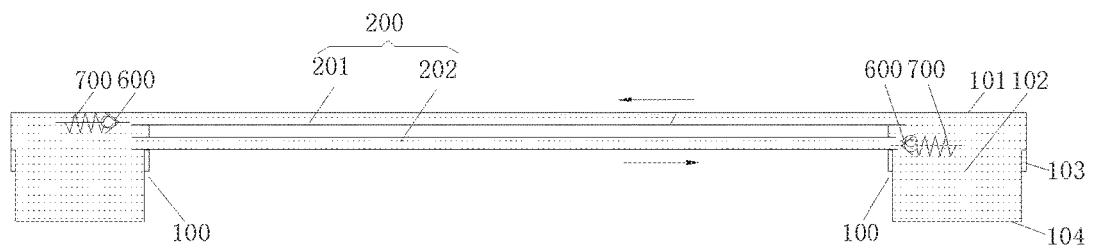
FIG. 2 is an operating-principle schematic diagram 2 of a support for household appliance according to embodiment I of the present disclosure.
Figure 3:
FIG. 3 is a side view of the supports group for household appliance according to embodiment I of the present disclosure.
Figure 4:
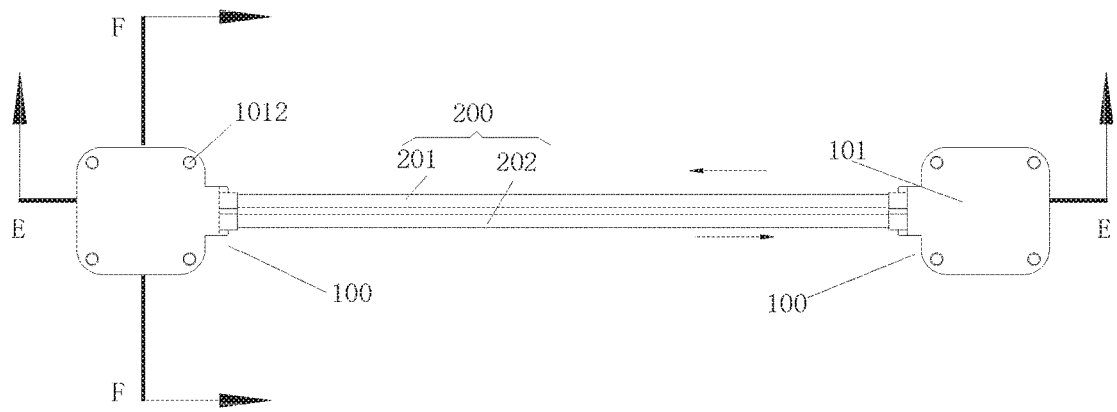
FIG. 4 is a top view of the supports group for household appliance according to embodiment I of the present disclosure.
Figure 5:
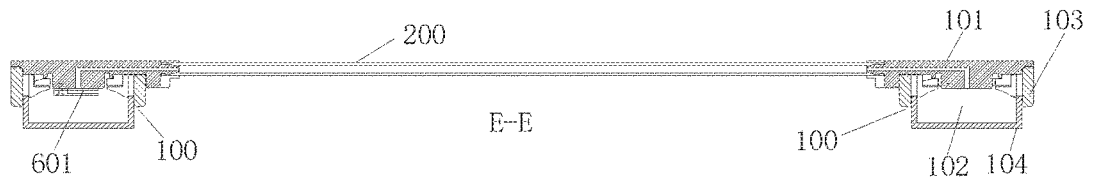
FIG. 5 is a section view of the supports group for household appliance according to embodiment I of the present disclosure taken along section E-E in the FIG. 4.

Reference Signs: 100—support for household appliance, 101—hydraulic plate, 1011—port, 1012—first mounting hole, 1013—second mounting hole, 1014—hydraulic nozzle, 1015—anti-off bulge, 1016—third mounting hole, 1017—hydraulic plate groove, 102—hydraulic medium, 103—sheath, 1031—guiding limiting groove, 1032—mounting plane, 1033—stopping end part, 104—regulating element, 1041—first guiding limiting block, 1042—second guiding limiting block, 105—rubber gasket, 106—pressing ring, 107—protective ring, 1071—embedding groove, 1072—protective curved surface, 108—flexible accommodation body, 1081—accommodating body, 200—hydraulic pipe, 201—first hydraulic pipe, 202—second hydraulic pipe, 400—communicating member, 401—groove, 402—sealing ring, 403—bolt, 404—pouring port, 405—liquid flow passage, 406—Sealing surface, 407—clamp, 500—throttling structure, 600—one-way flow stop mechanism, 601—one-way valve plate, 602—baffle plate, 603—through hole, 700—elastic device, 701—spring structure, 800—one-way valve structure, 801—valve ball.

DETAILED DESCRIPTION

A support for household appliance and household appliance, provided by the present disclosure, are described in detail as follows with reference to the accompanying drawings below:

Embodiment I

As shown in FIG. 1 to FIG. 7, a support for household appliance comprises:
a hydraulic plate 101;
a sheath 103, which is fixedly connected with the hydraulic plate 101;
a regulating element 104, which is arranged in the sheath 103 and is axially movable relative to the sheath 103;
an accommodation chamber, which is formed by the hydraulic plate 101, the sheath 103 and the regulating element 104; and
a hydraulic medium 102, which is arranged in the accommodation chamber and is compressed/expands depending on pressure changes to drive the regulating element 104 to axially move in the sheath 103 for leveling,
at least two supports 100 for household appliance communicate with each other to allow the hydraulic medium to flow between the supports; and
the hydraulic plate 101 is provided with a one-way flow stop mechanism 600 for conducting the hydraulic medium in one direction.

The support 100 for household appliance of the disclosure is interconnected to form a supports group for household appliance. When the washing machine is installed with a supports group for household appliance, due to the unevenness of the floor, different supports for household appliance have different levels. The regulating element 104 can be elongated or shortened like a piston to achieve the same internal hydraulic pressure and complete the automatic adjustment of the washing machine.

In addition, during washing process or dehydrating process of the washing machine, the vibration noise of the washing machine is greatly reduced because the hydraulic medium 102 can also slowly flow and level.

The one-way flow stop mechanism 600 of the present disclosure limits the unidirectional conduction of the hydraulic medium, so that when the support for household appliance is subjected to a large impact and the hydraulic medium 102 flows to a direction that does not conform to the conduction direction of the one-way flow stop mechanism 600, and the one-way flow stop mechanism prevents the sudden flow of the hydraulic medium 102 from causing a sudden expansion and contraction of the support for household appliance.

When the flow direction of the hydraulic medium is in conformity with conduction direction of the one-way flow stop mechanism 600, the opening of the one-way flow stop mechanism 600 is limited to avoid the sudden expansion and contraction of the support for the household appliance due to the large amount of flow of the hydraulic medium 102.

Further, the hydraulic plate 101 is provided with a liquid flow passage for allowing the hydraulic medium to flow therein, and the one-way flow stop mechanism 600 is arranged in the liquid flow passage or at an inlet/outlet of the liquid flow passage. In the present embodiment, the unidirectional conduction of the liquid flow passage is controlled by the one-way flow stop mechanism.

As a preferred implementation mode of the embodiment, the one-way flow stop mechanism 600 comprises a one-way valve plate 601, and the one-way valve plate 601 is arranged at the hydraulic plate 101 to cooperate with the inlet of the liquid flow passage to control the hydraulic medium 102 to flow out in one direction or flow into the accommodation chamber in one direction.

Figure 6:
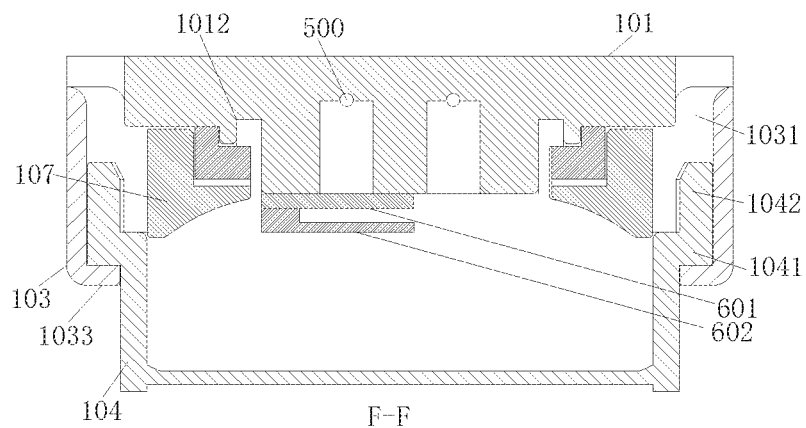
FIG. 6 is a section view of the supports group for household appliance according to embodiment I of the present disclosure taken along section F-F in the FIG. 4.

As shown in FIG. 6, as an embodiment of the one-way valve plate 601 in this embodiment, the one-way valve plate 601 is made of a self-recovery elastic deformation material, the one-way valve plate 601 covers hermetically on the inlet of the liquid flow passage, and the one-way valve plate 601 is deformed under the pressure of the hydraulic medium 102 to open the liquid flow passage, and is recovered under the action of elastic deformation force to close the liquid flow passage after the flow of the hydraulic medium 102 is stabilized.

Preferably, the one-way valve plate is made of a stainless steel belt, a polymer material PEEK, or a rubber elastomer of polymer material.

Further, the rapid flow of the hydraulic medium may cause sudden expansion and contraction of the support for household appliance. To prevent the rapid flow of the hydraulic medium due to the excessive opening of the one-way valve plate 601, the maximum opening of the one-way valve plate in this embodiment is limited to achieve "limiting" effects on hydraulic medium. Concretely, in the embodiment, the one-way flow stop mechanism 600 further comprises a baffle plate 602 installed on the hydraulic plate 101, the baffle plate 602 is located on one side of the one-way valve plate 601 opening direction, and the baffle plate 602 is used to block the excessive deformation of the one-way valve plate 601 to control the opening of the one-way valve plate 601.

Figure 7:
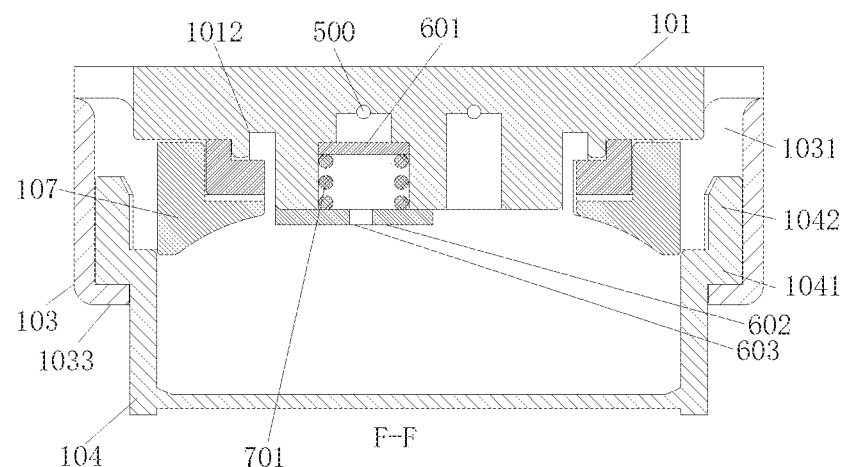
FIG. 7 is a section view of another embodiment of the supports group for household appliance according to embodiment I of the present disclosure taken along section F-F in the FIG. 4.
Figure 8:
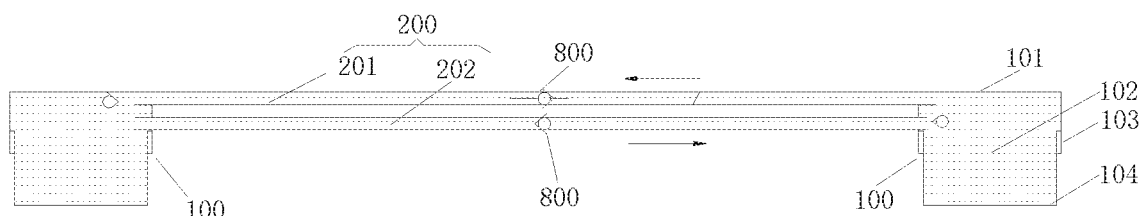
FIG. 8 is an operating-principle schematic diagram 1 of a support for household appliance according to embodiment II of the present disclosure.
Figure 9:
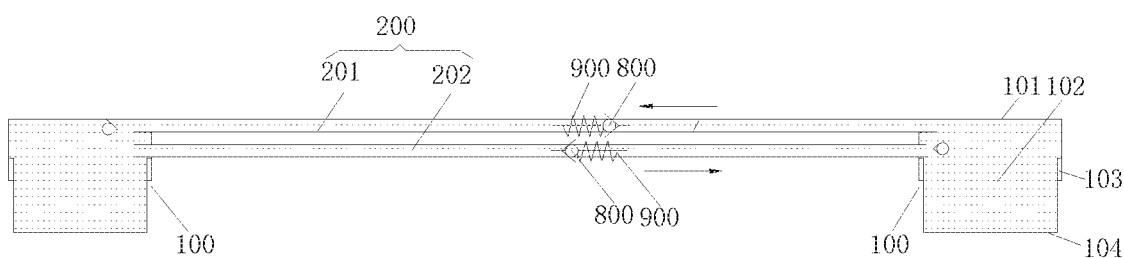
FIG. 9 is an operating-principle schematic diagram 2 of a support for household appliance according to embodiment II of the present disclosure.
Figure 10:
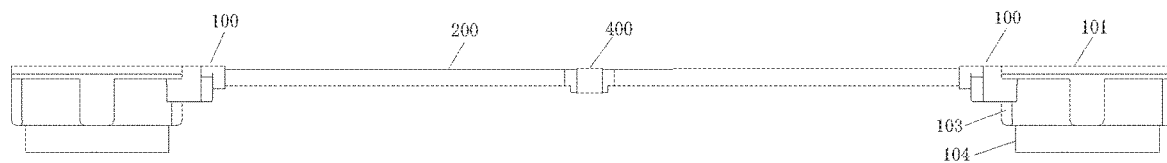
FIG. 10 is a side view of the supports group for household appliance according to embodiment II of the present disclosure.
Figure 11:
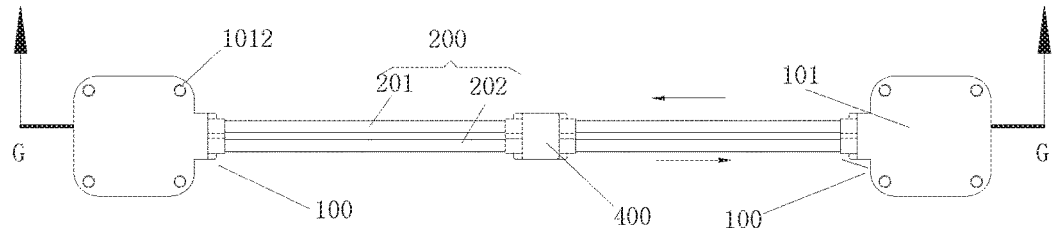
FIG. 11 is a top view of the supports group for household appliance according to embodiment II of the present disclosure.
Figure 12:
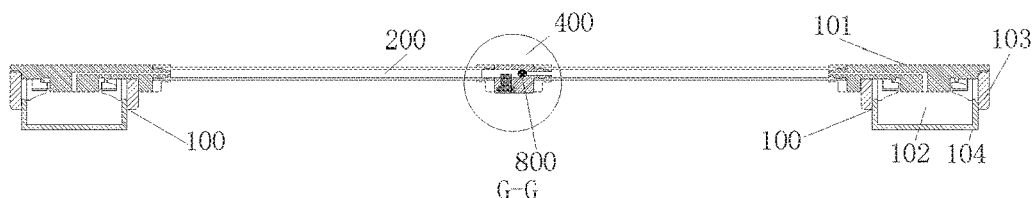
FIG. 12 is a section view of the supports group for household appliance according to embodiment II of the present disclosure taken along section G-G in the FIG. 11.
Figure 13:
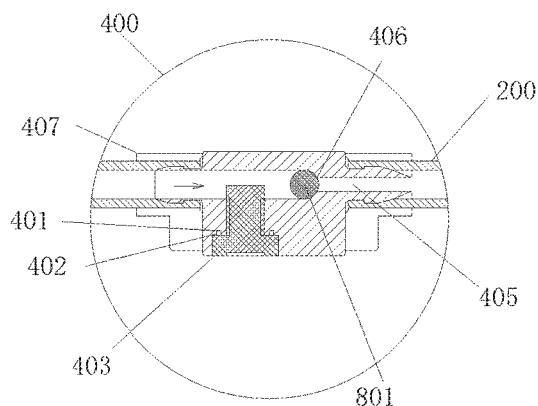
FIG. 13 is a local enlarged view of the FIG. 12 (valve ball is in closed state) of the supports group for household appliance according to embodiment II of the present disclosure.
Figure 14:
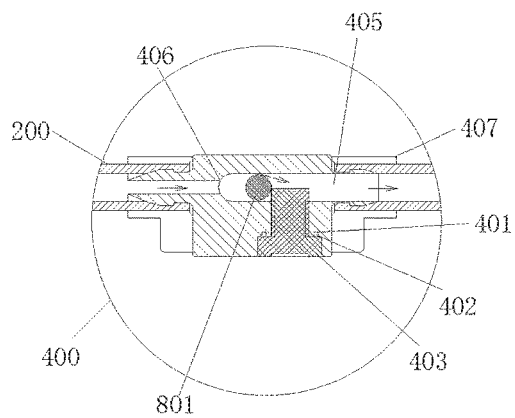
FIG. 14 is a local enlarged view of the FIG. 12 (valve ball is in opening state) of the supports group for household appliance according to embodiment II of the present disclosure.
Figure 15:
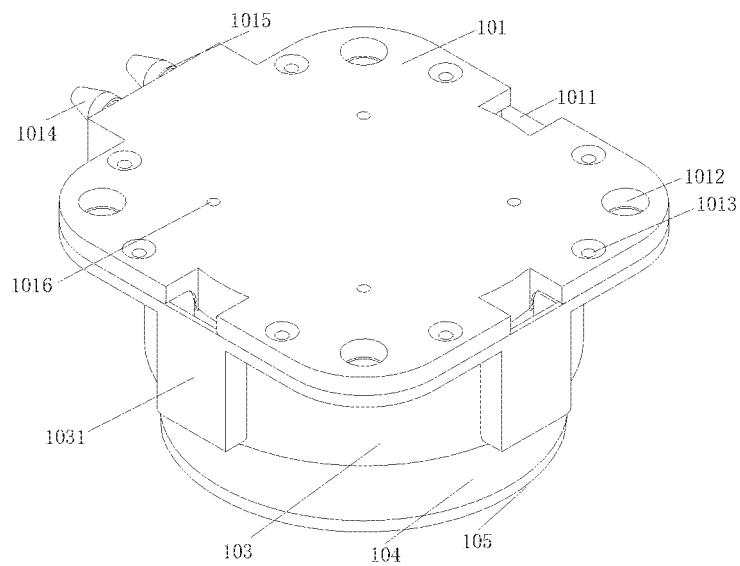
FIG. 15 is a stereoscopic schematic diagram of the support for household appliance according to embodiment III of the present disclosure.
Figure 16:
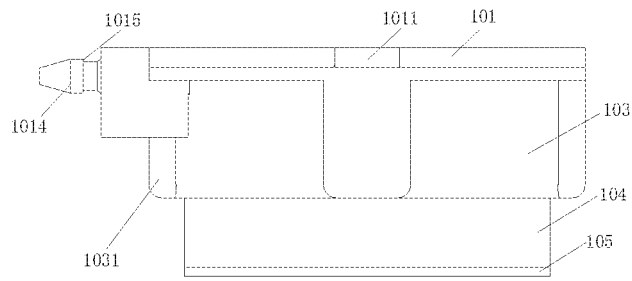
FIG. 16 is a front view of the support for household appliance according to embodiment III of the present disclosure.
Figure 17:
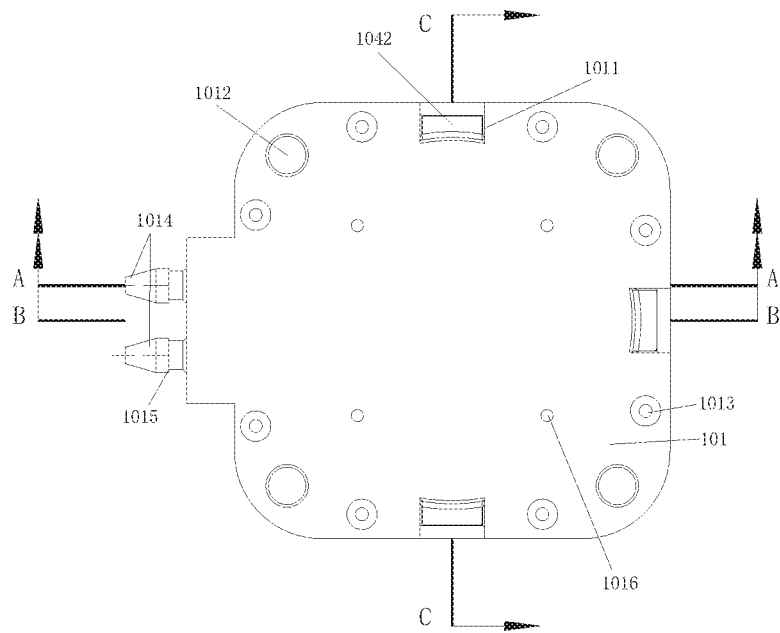
FIG. 17 is a top view of the support for household appliance according to embodiment III of the present disclosure.
Figure 18:
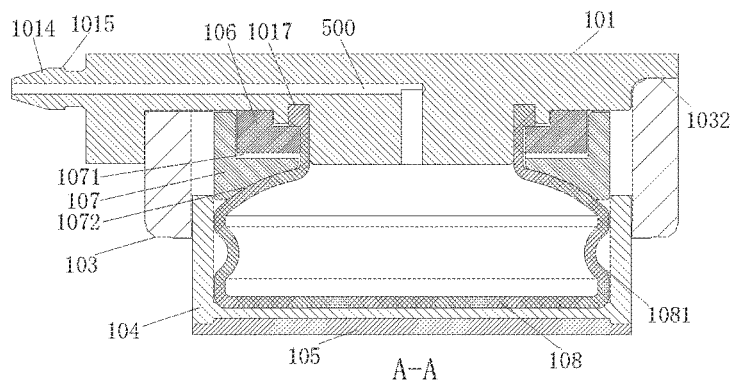
FIG. 18 is a section view of the support for household appliance according to embodiment III of the present disclosure taken along section A-A in the FIG. 17.
Figure 19:
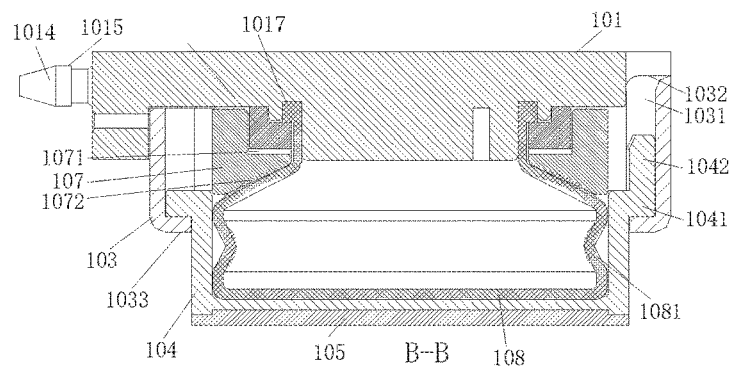
FIG. 19 is a section view of the support for household appliance according to embodiment III of the present disclosure taken along section B-B in the FIG. 17.
Figure 20:
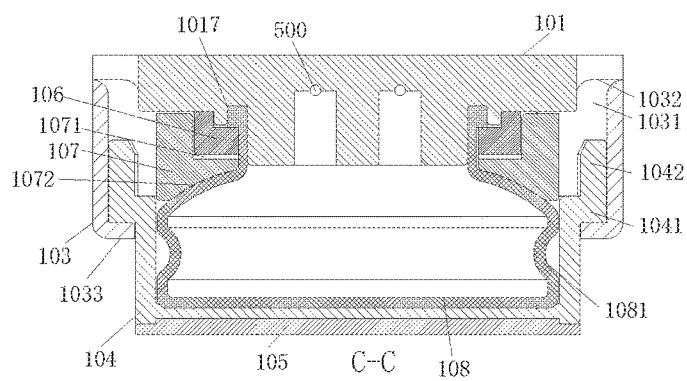
FIG. 20 is a section view of the support for household appliance according to embodiment III of the present disclosure taken along section C-C in the FIG. 17.
Figure 21:
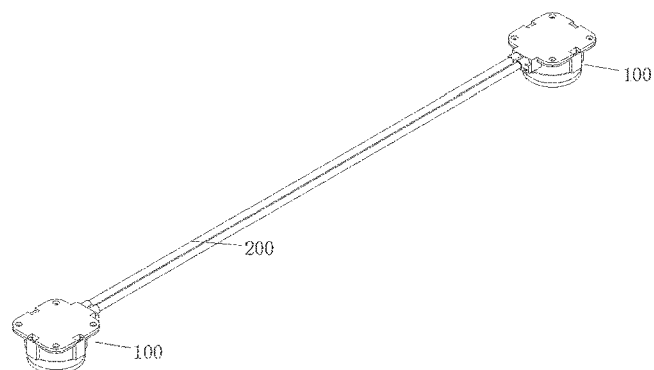
FIG. 21 is a schematic diagram of a combination mode I of the household appliance bottom supports according to embodiment III of the present disclosure.
Figure 22:
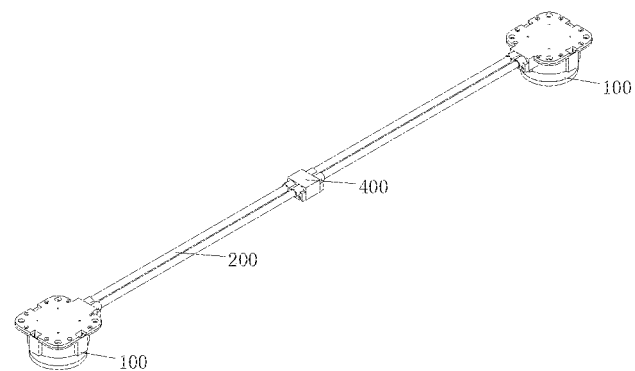
FIG. 22 is a schematic diagram of a combination mode II of the household appliance bottom supports according to embodiment III of the present disclosure.

As shown in FIG. 7, as another embodiment of the one-way valve plate 601 in this embodiment, the one-way valve plate 601 of this embodiment may not have elastic deformation recovery performance. The one-way flow stop mechanism 600 further comprises an elastic device 700 for resetting the one-way valve plate, the one-way valve plate 601 covers and blocks the liquid flow passage. The one-way valve plate 601 moves under the pressure of the hydraulic medium 102 to open the liquid flow passage, and is reset under the action of the elastic device 700 to close the liquid flow passage after the flow of the hydraulic medium 102 is stabilized.

Further, the rapid flow of the hydraulic medium may cause sudden expansion and contraction of the support for household appliance. To prevent the rapid flow of the hydraulic medium due to the excessive opening of the one-way valve plate 601, the maximum opening of the one-way valve plate in this embodiment is limited to achieve "limiting" effects on hydraulic medium. Concretely, in the embodiment, the one-way valve plate 601 is arranged in the liquid flow passage, the baffle plate 602 is arranged at the inlet of the liquid flow passage, and the baffle plate 602 is provided with a through hole 603; the elastic device 700 is arranged between the one-way valve plate 601 and the baffle plate 602.

The elastic device 700 in this embodiment is a spring structure.

Further, for the above embodiment, since the installation of the baffle plate affects the flow of the hydraulic medium, in this embodiment, the baffle plate 602 covers on the inlet of the liquid flow passage, a middle portion of the baffle plate 602 is provided with a through hole 603 for allowing the hydraulic medium to pass, and the diameter of the one-way valve plate 601 is larger than the diameter of the through hole 603.

As a preferred implementation mode of the embodiment, inside the hydraulic plate 101 is provided with two liquid flow passages for allowing the hydraulic medium 102 to flow, and the one-way flow stop mechanism 600 is disposed in one of the liquid flow passages.

A liquid flow passage provided with a one-way flow stop mechanism in the hydraulic plate 101 of one support 100 for household appliance communicates with a liquid flow passage without the one-way flow stop mechanism 600 in the hydraulic plate 101 of another support 100 for household appliance.

This embodiment also provides a household appliance with the support for household appliance as described above. The household appliance comprises at least two supports 100 for household appliance communicated with each other through communicating device so as to allow the hydraulic medium to flow between the supports for household appliance.

In the present embodiment, a first support for household appliance and a second support for household appliance are connected through a first hydraulic pipe and a second hydraulic pipe. The first support for household appliance and the second support for household appliance are provided respectively with one flow stop mechanism 600. The hydraulic plates 101 of the first support for household appliance and the second support for household appliance are provided respectively with two liquid flow passages comprising a first liquid flow passage and a second liquid flow passage. The first liquid flow passage and the second liquid flow passage are connected correspondingly with the first hydraulic pipe and the second hydraulic pipe.

Under the action of external force, the hydraulic medium in the first support can only flow to the second support through the second hydraulic pipe, and the hydraulic medium in the second support can only flow to the first support through the first hydraulic pipe.

Firstly, when the first support and the second support are evenly stressed and the hydraulic medium no longer flows, the one-way valve plate fits in and seals the first liquid flow passage, that is, the hydraulic medium does not flow from the first support for household appliance to the second support for household appliance.

Secondly, when the first support is subjected to a great impact, the one-way valve plate on the hydraulic plate of the first support automatically seals a liquid flow passage, ie, the first liquid flow passage and then seals the first hydraulic pipe. However, the hydraulic medium can still enter into the second hydraulic pipe through the second liquid flow passage and enter the second support for household appliance, and the pressure of the hydraulic medium automatically opens the one-way valve plate of the second support for household appliance. The baffle plate can limit the one-way valve plate to prevent it from being damaged due to excessive deformation, and at the same time it serves as a throttling function.

In this way, when the first support or the second support suddenly receives a large impact, at least one liquid flow passage automatically closes the liquid flow passage leading to the other support under the action of the one-way valve plate, thereby reducing the impact on the support.

On the one hand, it will avoid the sudden expansion and contraction of the support for household appliance that we do not expect, and on the other hand, it will avoid causing greater pressure impact damage to the supports for household appliance.

Embodiment II

As shown in FIG. 8 to FIG. 14, a support for household appliance comprises:
a hydraulic plate 101;
a sheath 103, which is fixedly connected with the hydraulic plate 101;
a regulating element 104, which is arranged in the sheath 103 and is axially movable relative to the sheath 103;
an accommodation chamber, which is formed by the hydraulic plate 101, the sheath 103 and the regulating element 104; and
a hydraulic medium 102, which is arranged in the accommodation chamber and is compressed/expands depending on pressure changes to drive the regulating element 104 to axially move in the sheath 103 for leveling,
a communicating device, which enables at least two supports for household appliance to communicate with each other to allow the hydraulic medium to flow between the supports for household appliance;
a one-way valve structure 800 is arranged in the communicating device for conducting the hydraulic medium in one direction.

The support 100 for household appliance of the disclosure is interconnected to form a supports group for household appliance. When the washing machine is installed with a supports group for household appliance, due to the unevenness of the floor, different supports for household appliance have different levels. The regulating element 104 can be elongated or shortened like a piston to achieve the same internal hydraulic pressure and complete the automatic adjustment of the washing machine.

In addition, during washing process or dehydrating process of the washing machine, the vibration noise of the washing machine is greatly reduced because the hydraulic medium 102 can also slowly flow and level.

The one-way valve structure 800 for conducting the hydraulic medium in one direction is disposed in the communicating device of this embodiment, so that after the leveling, the hydraulic medium 102 will not flow rapidly between the supports 100 for household appliance. In this way, a large pressure can be avoided to suddenly press the hydraulic medium 102 into another support for household appliance that communicates with it.

In the present embodiment, the communicating device comprises a hydraulic pipe 200 and a communicating member 400, and at least two supports for household appliance are connected with the same communicating member 400 through one corresponding hydraulic pipe 200 to communicate with each other. The one-way valve structure 800 is arranged in the communicating member 400.

Further, the communicating member 400 is provided with a liquid flow passage 405 for allowing the hydraulic medium 102 to flow therein, and the one-way valve structure 800 is arranged in the liquid flow passage 405 or at an inlet/outlet of the liquid flow passage.

As an preferred implementation mode of the embodiment, the liquid flow passage 405 comprises a first throttling flow passage and a second throttling flow passage. A diameter of the first throttling flow passage is larger than that of the second throttling flow passage. A sealing surface 406 is formed at the junction of the first flow passage and the second flow passage.

The one-way valve structure 800 includes a valve ball 801. The valve ball 801 is disposed in the first throttling flow passage. The hydraulic medium 102 flows from the first throttling flow passage to the second throttling flow passage. The valve ball 801 cooperates with the sealing surface 406 to seal and close the liquid flow passage 405 in one direction. The hydraulic medium 102 flows from the second throttling flow passage to the first throttling flow passage, and the liquid flow passage is open when the valve ball 801 moves away from the sealing surface 406.

Further, the first throttling flow passage is provided with a stopper mechanism for blocking the valve ball 801 from rolling continuously after moving away from the sealing surface 406.

As an preferred implementation mode of the embodiment, a pouring port 404 is arranged in the communicating members 400 which is used for pouring the hydraulic medium. The pouring port 404 is communicated with the first throttling flow passage. A sealing device is mounted on the pouring port 404 in a sealing manner. The sealing device extends into the first throttling flow passage to form the stopper mechanism.

In the present embodiment, the sealing and the stopper of the valve ball 801 are simultaneously achieved through the sealing device, and the structure design is more compact and ingenious.

As an preferred implementation mode of the embodiment, the one-way valve structure 800 includes a one-way valve plate, and the one-way valve plate 601 is arranged in the communicating members to cooperate with the liquid flow passage to control the hydraulic medium to flow in one direction.

Further, the one-way valve plate 601 is made of a self-recovery elastic deformation material, and after the deformation occurs, it can be elastically reset by itself.

Or, the one-way valve structure further comprises an elastic device 700 for resetting the one-way valve plate.

The communicating device 400 described in this embodiment includes two communicating passages for allowing the liquid medium to flow, and the two communicating passages are respectively provided with one-way valve structures 800 of which conduction directions are mutually opposite to each other.

Preferably, two liquid flow passages are disposed in the communicating member 400, and the two liquid flow passages are respectively provided with one-way valve structures 800 of which conduction directions are opposite to each other.

At the same time, this embodiment also provides a household appliance with the support for household appliance as described above. The household appliance comprises at least two supports 100 for household appliance communicated with each other through communicating device so as to allow the hydraulic medium to flow between the supports for household appliance.

In the present embodiment, the first support and the second support for household appliance are connected by the first hydraulic pipe and the second hydraulic pipe connected to the same communicating member 400. The communicating member 400 is provided with a first liquid flow passage and a second liquid flow passage corresponding to the first hydraulic pipe and the second hydraulic pipe inside. The communicating member 400 is provided with two one-way valve structures 800 to correspondingly control the conduction of the first liquid flow passage and the first liquid flow passage whose conduction directions are opposite to each other.

Under the action of external force, the hydraulic medium in the first support can only flow to the second support through the second hydraulic pipe, and the hydraulic medium in the second support can only flow to the first support through the first hydraulic pipe.

Firstly, when the first support and the second support are evenly stressed and the hydraulic medium no longer flows, the valve ball in the communicating member 400 can seal. (It is also possible to no longer seal, for example if the spring is preloaded behind the valve ball, ie it is still sealed, ie a one-way valve with a spring is formed).

Secondly, when the first support is subjected to a great impact, the valve ball in the communicating member 400 connected with the first hydraulic pipe is tightly pressed against the fitting sealing surface, and the flow path of the first liquid flow passage is automatically sealed.

Thirdly, when the first support is subjected to a great impact, the valve ball in the communicating member 400 connected with the second hydraulic pipe is away from the sealing surface and is stopped by the bolt, so as to prevent over-disengagement from causing the failure of the next sealing action and automatically open the flow path of the second hydraulic pipe.

In this way, when the first support or the second support suddenly receives a large impact, at least one liquid flow passage automatically closes the liquid flow passage leading to the other support under the action of the valve ball, thereby reducing the impact on the support.

On the one hand, it will avoid the sudden expansion and contraction of the support for household appliance that we do not expect, and on the other hand, it will avoid causing greater pressure impact damage to the supports for household appliance.

Embodiment III

As shown in FIG. 1 to FIG. 8, a support for household appliance comprises:

a hydraulic plate 101;

a sheath 103, which is fixedly connected with the hydraulic plate 101;

a regulating element 104, which is arranged in the sheath 103 and is axially movable relative to the sheath 103;

an accommodation chamber, which is formed by the hydraulic plate 101, the sheath 103 and the regulating element 104; and a hydraulic medium 102, which is arranged in the accommodation chamber and is compressed/expands depending on pressure changes to drive the regulating element 104 to axially move in the sheath 103 for leveling.

According to the support for household appliance provided by the embodiment, based on the hydraulic principle, the regulating element can perform adaptive regulation automatically because of the fluidity of the hydraulic medium due to different pressures resulting from unflatness, the hydraulic medium stops circulating until the support for household appliance achieves balance, and thus, automatic leveling is achieved.

According to the support for household appliance provided by the embodiment, a first mounting structure which is used for being fixedly connected with a bottom plate of a household appliance is arranged on the hydraulic plate 101; and a second mounting structure which is used for being fixedly connected with the sheath is arranged on the hydraulic plate.

According to the embodiment, the regulating element 104 is axially movably sleeved in the sheath 103, and then the hydraulic plate 101 is fixedly connected with the sheath 103 through the second mounting structure, so that the independent assembly of the support for household appliance is achieved. The assembled support for household appliance is then integrally mounted on the bottom plate of the household appliance through the first mounting structure, and thus, the support for household appliance is mounted on the household appliance.

According to the embodiment, the assembling of the support for household appliance is achieved through the second mounting structures, the support for household appliance is mounted on the household appliance through the first mounting structures. And corresponding mounting is achieved through different mounting structures, so that the global stability of the support for household appliance is ensured, and the stability of mounting of the support for household appliance on the household appliance is also ensured.

In this embodiment, the hydraulic plate 101 of the support for household appliance is directly fixed to the bottom of the household appliance, the sheath 103 and the hydraulic plate 101 are fixedly connected. Thus, the hydraulic plate 101 is clamped by the bottom of the household appliance and the sheath 103. So that the strength of fixed connection between the hydraulic plate 101 and the sheath 103 is not necessary, a main purpose of connection between the hydraulic plate 101 and the sheath 103 is to form an integrated support. And the strength of the connection is irrelevant to the size of gravity of the household appliance and the size of a supporting force of the regulating element 104. Therefore, for the support for household appliance provided by the present disclosure, the hydraulic plate 101 and the sheath 103 can be rapidly, reliably and fixedly connected, the requirements on the strength of connection between the hydraulic plate 101 and the sheath 103 are lowered, and the essential space and height required by the connection are further lowered.

In summary, the support for household appliance provided by the embodiment is simpler in structure, simpler and more convenient in mounting, and has better stability.

In addition, in a structural design of the support for household appliance provided by the embodiment, the overall height of the support for household appliance can be further lowered, and thus, the support for household appliance has a better shock absorption effect on the household appliance. Taking a washing machine as an example, the support for household appliance provided by the present disclosure has a better shock absorption effect on dewatering vibration of the washing machine.

As a preferred implementation mode of the embodiment, the first mounting structures are first mounting holes 1013 formed in the hydraulic plate. And the hydraulic plate 101 is fixedly connected to the bottom plate of the household appliance in a manner that first connecting members pass through the first mounting holes 1013.

Concretely, in the embodiment, the first mounting holes 1013 are screw holes, the first connecting members are screws. The mounting holes for the screws to pass through are formed in the bottom plate of the household appliance, and the screws pass through the mounting holes in the bottom plate and are mounted to the screw holes in the hydraulic plate 101 to achieve fixed mounting.

Concretely, in the embodiment, the second mounting structures are second mounting holes 1012, and the hydraulic plate is fixedly connected with the sheath in a manner that second connecting members pass through the second mounting holes.

Further, in the embodiment, the upper end of the sheath 103 is flanged to form a mounting plane 1032, and the mounting plane 1032 is fit with the bottom surface of the hydraulic plate 101 and is fixedly connected with the bottom surface of the hydraulic plate 101. And fourth mounting holes corresponding to the second mounting holes 1012 are formed in the mounting plane 1032.

According to the embodiment, the mounting plane 1032 of the sheath 103 is fit with the hydraulic plate 101, thus, more pressure can be transferred to the mounting plane 1032 and is dispersed to preventing the hydraulic plate 101 from bearing too high pressure. Because liquid flow passages for circulation of the hydraulic medium are formed inside the hydraulic plate 101, the stability of the hydraulic plate 101 is a key of the stabilizing and leveling of the entire support for household appliance. According to the embodiment, the mounting plane 1032 is formed by the outward flanging of the upper end of the sheath 103, thus, the mounting contact area of the sheath 103 and the hydraulic plate 101 is increased, which facilitates the stability and dispersion of the hydraulic plate 101 transmitting force to the mounting plane 1032 of the sheath 103.

In addition, the mounting plane 1032 of the sheath 103 is fit with the hydraulic plate 101 and is fixedly connected with the hydraulic plate 101 which avoid a designing of mounting structures on the sheath 103 or hydraulic plate 101 and lowering the overall structure of the support for household appliance.

Further, in the embodiment, an outline of the mounting plane 1032 is matched with that of the hydraulic plate 101, and the mounting plane 1032 is fit with the bottom surface of the hydraulic plate 101 and is fixedly connected with the bottom surface of the hydraulic plate 101. Thus, a pressure applied to the hydraulic plate 101 can be better correspondingly transferred to the mounting plane 1032 of the sheath 103 to avoid stress concentration caused by the partial contact of the hydraulic plate 101 with the mounting plane 1032, which further facilitates the stable circulation of the hydraulic medium in the hydraulic plate.

Preferably, in the embodiment, the outline of the hydraulic plate 101 is similar to or the same as that of the mounting plane 1032. Thus, the mounting is simpler and more convenient through corresponding the hydraulic plate 101 and the mounting plane 1032.

Concretely, in the embodiment, the sheath 103 comprises a sleeve part having a hollow interior, and one end of the regulating element 104 is sleeved in the sleeve part and is axially movable relatively. An upper end of the sleeve part is flanged to form the mounting plane 1032, and the mounting plane 1032 is fit with the bottom surface of the hydraulic plate 101 and is fixedly connected with the bottom surface of the hydraulic plate 101. According to the embodiment, the mounting plane 1032 is formed by the outward flanging of the upper end of the sleeve part, the regulating element 104 axially moves in the sheath 103, and only the area of the mounting plane is enlarged, the whole of the sheath 103 is not enlarged. Thus, materials are saved, and the cost is reduced.

Concretely, in the embodiment, the hydraulic plate 101 is of a square flat-plate structure, the sleeve part is of a cylindrical structure. An upper end of the cylindrical structure flanges outward to form the square mounting plane 1032 which is matched with the hydraulic plate. And the square flat-plate structure is fit with the square mounting plane and is fixedly connected with the square mounting plane.

Concretely, in the embodiment, at least one second mounting structure is arranged at each of four corners of the hydraulic plate; and one first mounting structure is is provided on at least one side of each second mounting structure;

preferably, one second mounting hole 1012 is formed at each of the four corners of the hydraulic plate 101, and the two sides of each second mounting hole 1012 are provided with a first mounting hole 1013.

In the embodiment, according to the structure and mounting characteristics of the support for household appliance, the first mounting holes 1013 are more than the second mounting holes 1012, so that the support for household appliance can be stably mounted on the household appliance. The first mounting holes 1013 are distributed at the two sides of the second mounting holes 1012, thus, the total weight of the household appliance can be more uniformly distributed on the hydraulic plate 101 to avoid the damage of the hydraulic plate caused by local stress concentration.

As a mounting mode of the embodiment, the sheath 103 and the hydraulic plate 101 can be fixedly connected by clamping, adhesive bonding, hot melt, or welding, and then fixedly mounted on the bottom of the household appliance.

According to the embodiment, the hydraulic plate 101 is made of plastics through integral injection molding or made of metal through die-casting. And the sheath 103 is made of plastics through integral injection molding or made of a metallic material through die-casting.

According to stress characteristics of the support for household appliance provided by the embodiment, preferably, the hydraulic plate 101 is made of plastics through integral injection molding. And the sheath 103 is made of metal through die-casting. Due to larger stress on the sheath 103, the sheath 103 is made of metal through die-casting to guarantee strength, thus, the support for household appliance provided by the embodiment is lower in manufacturing cost, and the overall strength of the support for household appliance can be guaranteed.

Partial gravity F1 of the household appliance is applied to the hydraulic plate 101 through the bottom plate. The plane of the hydraulic plate 101 can transmit the force to the mounting plane 1032 of the sheath 103. Stress of the interior of the hydraulic plate 101 is transferred to the regulating element 104 through hydraulic pressure, the regulating element 104 similarly bears a supporting force F2 from a supporting surface, the F1 is equal to the F2. And stress of the regulating element 104 is transferred to the plane of the hydraulic plate 101, and the stress is then transferred to the bottom plate of the household appliance by the hydraulic plate 101. By such a design, although the hydraulic plate 101 bears a pressure force of internal liquid flow passages, a partial gravity force of the washing machine and the supporting force of the regulating element 104, the forces are all transferred to the mounting plane 1032 of the sheath 103, the regulating element 104 and the bottom plate of the household appliance.

As a preferred implementation mode of the embodiment, the support for household appliance provided by the embodiment further comprises a flexible accommodation body 108 with a chamber therein, and the hydraulic medium is accommodated in the flexible accommodation body 108; and a third mounting structure which is used for mounting the flexible accommodation body 108 in a sealed manner is arranged on the hydraulic plate 101.

Concretely, the liquid flow passages are formed inside the hydraulic plate 101, the flexible accommodation body 108 has an opening part, and the opening part of the flexible accommodation body 108 is fixedly mounted on the bottom surface of the hydraulic plate 101 through a pressing ring 106 and communicates with the liquid flow passages. And the third mounting structures are third mounting holes 1016, and the pressing ring 106 is assembled on the third mounting holes 1016 through third connecting members.

Further, in the embodiment, the third mounting hole 1016 is disposed in the middle part of the hydraulic plate, and the third mounting hole includes at least four, corresponding to the four corners of the hydraulic plate 101.

As a preferred implementation mode of the embodiment, in the embodiment, the opening part of the flexible accommodation body 108 is fixedly mounted on the bottom surface of the hydraulic plate 101 through the pressing ring 106, and the pressing ring 106 and the hydraulic plate 101 jointly press the opening part to deform and seal. According to the embodiment, the pressing ring 106 is used for pressing the opening part to deform for sealing, so that the sealing is simpler and more convenient, and the sealing effect is good.

Further, the flexible accommodation body 108 comprises a small-diameter part, one end part of the small-diameter part is flanged to form the opening part. The pressing ring 106 sleeves on the small-diameter part, the pressing ring 106 and the hydraulic plate 101 jointly press the opening part to deform and seal. According to the embodiment, during the sealed mounting of the flexible accommodation body 108, the small-diameter part can be firstly nested in the pressing ring 106, and only the pressing ring 106 is need to be fixedly mounted. In the process of fastening, the pressing ring 106 presses the opening part to achieve the sealed mounting.

As an implementation mode of the embodiment, a hydraulic plate groove is arranged at the bottom surface of the hydraulic plate 101, and the opening part of the flexible accommodation body 108 is deformed and filled into the hydraulic plate groove for sealing under pressure of the pressing ring 106. In this mode, sealing can be achieved through fastening the pressing ring 106 and pressing the opening part of the flexible accommodation body 108 to deform and fill into the hydraulic plate groove. The structure is simple, and the sealing is reliable and effective.

Preferably, a volume enclosed by the hydraulic plate groove and the pressing ring 106 is smaller than the volume of the opening part of the flexible accommodation body 108. Thus, the opening part of the flexible accommodation body 108 can be in tight contact with the hydraulic plate groove to ensure sealing performance.

According to the embodiment, the pressing ring 106 is fixed to the hydraulic plate 101 through fixing devices. And specifically the pressing ring 106 and the hydraulic plate 101 can be fixedly connected through bolts/screws. The pressing ring 106 is provided with a pressing ring mounting hole. And the bolts/screws pass through the pressing ring mounting holes and are fastened to the third mounting holes 1016 of the hydraulic plate 101.

According to the embodiment, the flexible accommodation body 108 comprises an accommodating body 1081. The accommodating body 1081 is of a soft capsular structure which has a corrugation structure of telescopic. And the corrugation structure is arranged in the regulating element 104 and extends and retracts depending on the flowing of the hydraulic medium to drive the regulating element 104 to axially move in the sheath 103 for leveling.

The support for household appliance, provided by the embodiment, further comprises a protective member 107 for protecting the flexible accommodation body 108. The pressing ring 106 is embedded in the protective member 107, and then, technical effects as follows are achieved:

1. According to the embodiment, the pressing ring 106 and the protective ring 107 are mounted in an embedded manner so as to limit the position of pressing ring 106 and prevent the installation of a complicated limit structure. And this limiting is simple and stable.

2. According to the support for household appliance provided by the embodiment, under extremely high impact pressure (for example, a household appliance or an object equipped with the support for household appliance falls off or is lifted and suddenly placed), as there is no gap between the protective ring 107 and the pressure exerted fitting surfaces of the flexible accommodation body 108, so that the flexible accommodation body 108 is prevented from problems such as expansion cracking resulting from gaps, and the reliability is improved.

3. According to the embodiment, the pressing ring 106 and the protective ring 107 are mounted in an embedded manner, and the mounting height of the pressing ring 106 and the protective ring 107 is lowered, so that the overall height of the support for household appliance is lowered. And the influence on the overall center of gravity of the household appliance caused by mounting the support for household appliance on the household appliance is less, the stability of supporting of the household appliance is better facilitated, and the shock absorption effect on vibration of the household appliance during working (for example, dewatering vibration of the washing machine) is better.

As a preferred implementation mode of the embodiment, a protective curved surface 1072 is arranged at one end of the protective ring 107 and is matched with an outside surface of the flexible accommodation body 108 to prevent the flexible accommodation body 108 from being broken under pressure.

According to the embodiment, an embedding groove 1071 is formed in the other end of the protective ring 107, and the pressing ring 106 is embedded in the embedding groove 1071 of the protective ring 107.

As a preferred implementation mode of the embodiment, a limiting convex portion is formed on the internal wall of the embedding groove 1071 of the protective ring 107, and a limiting concave portion matched with the limiting convex portion is formed on a fixing member. According to the embodiment, a limiting structure is designed according to the embedded mounting of the pressing ring 106 and the protective ring 107, and limiting motion is achieved while carrying out embedded mounting. And thus, the structure is simple, stable and reliable.

According to the embodiment, the depth of the embedding groove 1071 is greater than the thickness of the pressing ring 106, thus, the pressing ring 106 can be completely embedded into the embedding groove 1071, and the mounting height is lowered to the maximum to lower the overall height of the support for household appliance. Meanwhile, when the support for household appliance is in an out-of-flat state, each flexible accommodation body 108 bears different pressure forces, so the hydraulic medium flows, and the flexible accommodation body 108 extends and retracts to drive the regulating element 104 to axially move in the sheath 103 for leveling. The extending and retracting of the flexible accommodation body 108 inevitably acts on the protective ring 107, and the protective ring 107 axially moves under the embedded limiting of the embedding groove 1071 and the pressing ring 106.

In the embodiment, the circumference of the protective ring 107 completely wraps the pressing ring 106, and the protective ring 107 is pressed into the regulating element 104, and thus, the reliability and the stability of fitting are greatly improved. Therefore, after the protective ring 107 is pressed into the regulating element 104, the protective ring 107 will always axially move in the regulating element 104 stably, and the moving is smooth and reliable. The entire support for household appliance can be more stable because of the protective ring 107 and the regulating element 104, and both the protective ring 107 and the pressing ring 106 can have a certain amount of activity up and down.

According to the support for household appliance provided by the embodiment, the sheath 103 and/or the regulating element 104 are provided with a guiding limiting mechanism which is used for limiting the circumferential rotation of the regulating element 104 relative to the sheath 103. And a port 1011 corresponding to the guiding limiting mechanisms is arranged in the hydraulic plate 101.

According to the support for household appliance provided by the embodiment, the household appliance is automatically leveled by using the hydraulic principle, and the leveling is simple and reliable. And the regulating element 104 is arranged in the sheath 103 in a manner of being capable of axially moving relative to the sheath 103, and the regulation on the household appliance is only limited to a vertical direction, so that in order to guarantee the stability of leveling, the rotation of the regulating element 104 relative to the sheath 103 is need to be limited. Therefore, the guiding limiting mechanisms are used for limiting the regulating element 104 to move along a required direction relative to the sheath 103.

As the household appliance (for example, a washing machine) generally will generate vibration during working, in order to guarantee the stability of running of the household appliance, the overall height of the support for household appliance provided by the embodiment should be lowered as far as possible to lower the center of gravity of the household appliance. Therefore, the ports 1011 are formed in the hydraulic plate 101 corresponding to the guiding limiting mechanisms.

While meeting the setting of the guide limiting mechanism, it does not affect the axial movement of the regulating element 104, so as to reduce the overall height of the support for household appliance and improve the damping stability. Concretely, the guiding limiting mechanisms comprise a guiding limiting groove/a guiding limiting convex portion arranged on the internal wall of the sheath and a guiding limiting convex portion/a guiding limiting groove correspondingly arranged on the external wall of the regulating element. And the guiding limiting convex portions are arranged in the guiding limiting grooves in a relative slidable manner to limit the circumferential rotation of the regulating element relative to the sheath. According to the embodiment, the axial moving of the regulating element 104 can be limited through the cooperation of the guiding limiting grooves and the guiding limiting convex portions, and thus, the structure is simple and reliable.

According to the embodiment, the ports 1011 are arranged corresponding to the guiding limiting convex portions/guiding limiting grooves of the regulating element 104, and the regulating element 104 moves towards the hydraulic plate 101. One end of each guiding limiting convex portion/guiding limiting groove of the regulating element 104 enters one corresponding port 1011. According to the embodiment, in view of the axial moving of the regulating element 104, only the yielding parts are need to be arranged corresponding to the guiding limiting convex portions/guiding limiting grooves of the regulating element 104 regardless of the type of the guiding limiting mechanisms. So that, on the premise of not changing regulating height, the overall height of the support for household appliance is lowered, and the stability of guiding and limiting is guaranteed.

As a preferred implementation mode of the embodiment, guiding limiting grooves 1031 are formed in the internal wall of the sheath 103 along an axial direction of the sheath 103. The guiding limiting convex portions are arranged on the external wall of the regulating element 104, and the guiding limiting convex portion is relatively slidably disposed in the guiding limiting groove 1031 to limit the circumferential rotation of the regulating element 104 relative to the sheath 103.

According to the embodiment, the ports 1011 are formed in the hydraulic plate 101 corresponding to the guiding limiting convex portions. The regulating element 104 axially moves up and down in the sheath 103, and one end of each guiding limiting convex portion goes into/out of one corresponding port 1011.

Therefore, according to the support for household appliance provided by the embodiment, one end of each guiding limiting convex portion goes into/out of to one corresponding port 1011, so that a greater regulating height is achieved under the condition of the same overall height. And under the condition of the same regulating height, the support for household appliance provided by the embodiment can have a smaller overall height.

As a preferred implementation mode of the embodiment, each guiding limiting convex portion comprises a first guiding limiting block 1041 and a second guiding limiting block 1042. The first guiding limiting blocks 1041 are fixed to the external wall of the regulating element 104, and the second guiding limiting blocks 1042 are fixed to the first guiding limiting blocks 1041 and extend by a certain height towards the hydraulic plate 101. According to the embodiment, the first guiding limiting blocks 1041 mainly play roles in carrying out guiding and limiting in the guiding limiting grooves 1031, and the second guiding limiting blocks 1042 prolong the first guiding limiting blocks 1041. And thus, the stability of guiding and limiting is better.

As a preferred implementation mode of the embodiment, a plurality of guiding limiting mechanisms are distributed along circumferential directions of the sheath 103 and/or the regulating element 104. And a plurality of ports 1011 are formed in the hydraulic plate 101 corresponding to the guiding limiting mechanisms. By setting a plurality of guiding limiting mechanisms, the stability of limiting is further improved, and the effect of guiding and limiting is better.

According to the embodiment, in order to achieve the up-and-down movement of the regulating element 104 in the sheath 103 and prevent circumferential rotation, a certain quantity of guiding limiting grooves 1031 are formed in the circumference of the sheath 103, and the quantity is N which is greater than or equal to 1. In a graphic illustration of the present disclosure, N is 4 preferably.

Corresponding guiding limiting convex portions are arranged on the circumference of the regulating element 104, and the quantity of the guiding limiting convex portions is N which is greater than or equal to 1. In a graphic illustration of the present disclosure, N is 4 preferably. The guiding limiting convex portions can move in the guiding limiting grooves and are limited by stopping end parts 1032 in bottom of the guiding limiting grooves 1031 to prevent the regulating element 104 from falling off from the sheath 103.

In order to lower the height of the support for household appliance as far as possible and achieve better stability, the height of a sheath 200 and the height of a regulating element 300 can be reduced as far as possible in principle, particularly the height of a superposed part, i.e. H1 in a graphic illustration, under the condition of not lowering a regulating height H0. When H1 is very small, the limiting function of the sheath 200 to the regulating element 300 will be lowered, and the problems such as biasing of the regulating element 300 are caused.

Embodiment IV

The support for household appliance, provided by the embodiment, comprises a hydraulic plate 101, which is internally provided with a throttling flow passage; a sheath 103, which is fixedly connected with the hydraulic plate 101; a regulating element 104, which is arranged in the sheath 103 and is axially movable relative to the sheath 103; an accommodation chamber, which is formed by the hydraulic plate 101, the sheath 103 and the regulating element 104; and a flexible accommodation body 108, which accommodates a hydraulic medium and is arranged in the accommodation chamber. The flexible accommodation body 108 extends and retracts to drive the regulating element 104 to axially move in the sheath 103 for leveling under the action of pressure. The support for household appliance further comprises a rubber gasket 105 which is fixed to the bottom of the regulating element 104. The bottom of the rubber gasket 105 has designed patterns, thus, the friction force to the ground is increased, and the stability is enhanced.

Embodiment V

The embodiment also provides a household appliance with the support for household appliance provided by any one of the above-mentioned embodiments. The household appliance comprises a casing, and a plurality of supports are mounted at the bottom of the casing. And a hydraulic medium filled in the household appliance bottom supports 100 can flow among the household appliance bottom supports for leveling.

Preferably, at least two supports 100 communicate with each other through communicating devices to achieve the flowing of the hydraulic medium among the household appliance bottom supports.

According to the embodiment of the present disclosure, taking a washing machine for example, a principle and a method for automatic leveling of the washing machine by using the support for household appliance provided by the present disclosure are elaborated. After the washing machine is mounted, different supports are different in horizontal height due to an out-of-flat ground surface, and the supports located at pits of the ground surface are low in position.

Thus, the household appliance bottom supports at high positions firstly bear the weight of the washing machine and bear a large gravity force, and the supports at low positions bear a smaller gravity force or failure of support problem.

Regulating elements of the supports for household appliance at high positions move up under high pressure, and heights of the entire supports are reduced, thus, volumes of hollow chambers of flexible accommodation bodies full of the hydraulic medium are compressed and reduced. The hydraulic medium is forced to enter throttling holes or valve holes and enter into the supports at low positions through high-pressure pipes. Thus, the hydraulic medium in flexible accommodation bodies of the supports for household appliance at low positions becomes more and more, and the flexible accommodation bodies are expanded to promote the stretching of the regulating elements.

When the supports at high positions and the supports at low positions are the same in hydraulic pressure, the hydraulic medium does not flow through the high-pressure pipes any more. Relative positions of the regulating elements and a bottom plate of the washing machine do not change any more, and the automatic regulating of the washing machine is completed.

During the washing or dewatering process of the washing machine, the hydraulic medium can also slowly flow for self-leveling, so that vibration noises of the washing machine are greatly lowered.

According to the embodiment, the hydraulic medium may be hydraulic fluid which is good in fluidity and stable in ingredient.

In addition, the support for household appliance provided by each of the above-mentioned embodiments of the present disclosure, can also be applied to household appliances such as electric refrigerators, coolers and air-conditioner indoor units, besides washing machines.

It should be noted that each of the above-mentioned embodiments of the present disclosure can be implemented independently and can also be implemented by combining a plurality of embodiments.

What described above are only preferred embodiments of the present disclosure, but are not intended to limiting the scope of the present disclosure in any forms. Although the present disclosure has been disclosed in terms of preferred embodiments, it is not limited thereto. Without departing from the scope of the technical solution of the present disclosure, any persons skilled in the present disclosure can make equivalent embodiments with various alterations and modifications as equivalent variations by utilizing the above-mentioned technical contents. However, without departing from the contents of the technical solution of the present disclosure, any simple changes, equivalent variations and modifications made according to the technical essence of the present disclosure shall all be covered within the scope of the technical solution of the present disclosure.

The invention claimed is:

1. A support arrangement for a household appliance, comprising:
    at least two supports, each support including:
        a hydraulic plate;
        a sheath, fixedly connected with the hydraulic plate;
        a regulating element, arranged in the sheath and axially movable relative to the sheath for leveling, the regulating element configured to be driven by a hydraulic medium; and
        an accommodation chamber formed by the hydraulic plate, the sheath and the regulating element for containing the hydraulic medium, wherein
    the at least two supports for fluidically communicate with each other for allowing the hydraulic medium to flow between the supports,
    the hydraulic plate is provided with a one-way flow stop mechanism configured to conduct the hydraulic medium in one direction,
    the hydraulic plate is provided with a liquid flow passage for allowing the hydraulic medium to flow therein,
    the one-way flow stop mechanism includes a one-way valve plate and a baffle plate installed on the hydraulic plate,
    the one-way valve plate is arranged at the hydraulic plate to cooperate with an inlet of the liquid flow passage for controlling the hydraulic medium to flow out in one direction or flow into the accommodation chamber in one direction, and
    the baffle plate is located on one side of the one-way valve plate in an opening direction and blocks excessive deformation of the one-way valve plate.

2. A support arrangement for a household appliance, comprising:
    at least two supports, each support including:
        a hydraulic plate;
        a sheath, fixedly connected with the hydraulic plate;
        a regulating element arranged in the sheath and axially movable relative to the sheath for leveling, the regulating element configured to be driven by a hydraulic medium; and
        an accommodation chamber formed by the hydraulic plate, the sheath and the regulating element for containing the hydraulic medium, wherein
    the at least two supports fluidically communicate with each other for allowing the hydraulic medium to flow between the supports,
    the hydraulic plate is provided with a one-way flow stop mechanism configured to conduct the hydraulic medium in one direction,
    the hydraulic plate is provided with a liquid flow passage for allowing the hydraulic medium to flow therein,
    the one-way flow stop mechanism includes a one-way valve plate, the one-way valve plate is arranged at the hydraulic plate to cooperate with an inlet of the liquid flow passage for controlling the hydraulic medium to flow out in one direction or flow into the accommodation chamber in one direction,
    the one-way valve plate is made of a self-recovery elastic deformation material, the one-way valve plate covers hermetically on the inlet of the liquid flow passage, and
    the one-way valve plate is configured to deform under a pressure of the hydraulic medium to open the liquid flow passage, and is configured to recover under an action of elastic deformation force to close the liquid flow passage after the flow of the hydraulic medium is stabilized.

3. A support arrangement for a household appliance, comprising:
    at least two supports, each support including:
        a hydraulic plate;
        a sheath, fixedly connected with the hydraulic plate;
        a regulating element arranged in the sheath and axially movable relative to the sheath for leveling, the regulating element configured to be driven by a hydraulic medium; and
        an accommodation chamber formed by the hydraulic plate, the sheath and the regulating element for containing the hydraulic medium, wherein the at least two supports fluidically communicate with each other for allowing the hydraulic medium to flow between the supports, the hydraulic plate is provided with a one-way flow stop mechanism configured to conduct the hydraulic medium in one direction, the hydraulic plate is provided with a liquid flow passage for allowing the hydraulic medium to flow therein, the one-way flow stop mechanism includes a one-way valve plate, the one-way valve plate is arranged at the hydraulic plate to cooperate with an inlet of the liquid flow passage for controlling the hydraulic medium to flow out in one direction or flow into the accommodation chamber in one direction, the one-way flow stop mechanism includes an elastic device for resetting the one-way valve plate, the one-way valve plate covers and blocks the liquid flow passage, and the one-way valve plate configured to move under a pressure of the hydraulic medium to open the liquid flow passage, and to reset under an action of the elastic device to close the liquid flow passage after the flow of the hydraulic medium is stabilized.

4. The support arrangement fora household appliance according to claim 3, wherein the one-way flow stop mechanism further comprises:

a baffle plate installed on the hydraulic plate, the baffle plate is located on one side of the one-way valve plate in an opening direction, the baffle plate is used to block excessive deformation of the one-way valve plate, the baffle plate is provided with a through hole, and the elastic device is arranged between the one-way valve plate and the baffle plate.

5. The support arrangement for a household appliance according to claim 1, wherein the baffle plate covers the inlet of the liquid flow passage, a middle portion of the baffle plate is provided with a through hole for allowing the hydraulic medium to pass, and a diameter of the one-way valve plate is larger than a diameter of the through hole.

6. The support arrangement for a household appliance according to claim 1, wherein the hydraulic plate is provided with two liquid flow passages for allowing the hydraulic medium to flow, and the one-way flow stop mechanism is disposed in one of the liquid flow passages;

the liquid flow passage provided with the one-way flow stop mechanism in the hydraulic plate of one support of the at least two supports communicates with the liquid flow passage without a one-way flow stop mechanism in a hydraulic plate of another support of the at least two supports.

7. A household appliance, comprising the support arrangement for the household appliance according to claim 1.

8. The support arrangement for a household appliance according to claim 1, wherein the one-way valve plate is made of a self-recovery elastic deformation material, the one-way valve plate covers hermetically on the inlet of the liquid flow passage, and the one-way valve plate is configured to deform under a pressure of the hydraulic medium to open the liquid flow passage, and is configured to recover under an action of elastic deformation force to close the liquid flow passage after the flow of the hydraulic medium is stabilized.

9. The support arrangement for a household appliance according to claim 2, wherein the one-way valve plate is made of a stainless steel belt, a polymer material PEEK, or a rubber elastomer of polymer material.

10. The support arrangement for a household appliance according to claim 1, wherein the one-way flow stop mechanism further comprises:

an elastic device for resetting the one-way valve plate, the one-way valve plate covers and blocks the liquid flow passage, the one-way valve plate configured to move under a pressure of the hydraulic medium to open the liquid flow passage, and to reset under an action of the elastic device to close the liquid flow passage after the flow of the hydraulic medium is stabilized.

11. The support arrangement for a household appliance according to claim 1, comprising:

the hydraulic medium arranged in the accommodation chamber, wherein the hydraulic medium is compressible and expandable depending on pressure changes to drive the regulating element to axially move in the sheath for leveling.

12. The support arrangement for a household appliance according to claim 2, comprising:

the hydraulic medium arranged in the accommodation chamber wherein the hydraulic medium is compressible and expandable depending on pressure changes to drive the regulating element to axially move in the sheath for leveling.

13. The support arrangement for a household appliance according to claim 3, comprising:

the hydraulic medium arranged in the accommodation chamber wherein the hydraulic medium is compressible and expandable depending on pressure changes to drive the regulating element to axially move in the sheath for leveling.

* * * * *